US006318068B1

(12) United States Patent
Shaw

(10) Patent No.: US 6,318,068 B1
(45) Date of Patent: Nov. 20, 2001

(54) VALVE ACTUATING MECHANISM FOR A PISTON ENGINE

(76) Inventor: John B. Shaw, 1812 E. Marlette Ave., Phoenix, AZ (US) 85016

( * ) Notice: Subject to any disclaimer, the term of this patent is extended or adjusted under 35 U.S.C. 154(b) by 0 days.

(21) Appl. No.: 09/757,974

(22) Filed: Jan. 10, 2001

(51) Int. Cl.[7] .......... F02C 5/00
(52) U.S. Cl. .......... 60/39.6; 60/508; 60/670
(58) Field of Search .......... 60/508, 513, 514, 60/39.6, 70

(56) References Cited

U.S. PATENT DOCUMENTS 2,543,758 * 3/1951 Bodine, Jr. .......... 60/39.6
4,716,720 * 1/1988 Eickmann .......... 60/39.6
5,551,233 * 9/1996 Tomoiu .......... 60/39.6 X

FOREIGN PATENT DOCUMENTS

468610 * 2/1914 (FR) .......... 60/39.6

* cited by examiner

*Primary Examiner*—Hoang Nguyen
(74) *Attorney, Agent, or Firm*—Frank J. McGue

(57) ABSTRACT

A mechanism is disclosed for actuating the intake and exhaust valves of a reciprocating multiple cylinder external combustion vapor expansion engine in either forward and reverse rotation.

Electrical solenoid and pressure actuating valve mechanisms responding to a sophisticated digital computer program replaces the cam shafts, push rods, adjustable tappets, throttle, fuel injection, and cooling systems of a conventional internal combustion Diesel engine.

The computer integrates the many system variables, including, temperature, pressure, speed, friction, mass, and acceleration to obtain the optimum efficiency of shaft work output.

7 Claims, 1 Drawing Sheet

VALVE ACTUATING MECHANISM FOR A PISTON ENGINE

TECHNICAL FIELD

This invention relates in general to self-powered vehicles and more particularly to non-electric commuter rail cars, regional rapid transit cars, long distance inter-city passenger and express mail trains.

BACKGROUND OF THE INVENTION

The majority of the non-electric powered transit systems of the world use the internal combustion Diesel engine to provide the motive force to propel the train. Two basic methods are used to transmit the shaft work of the Diesel engine to the driving wheels of the vehicle for travel in either direction.

In heavy main line locomotives, a Diesel engine coupled to a generator provides variable electric energy to conventional wheel axle mounted electric traction motors.

In modern inter-city and regional light rail passenger coaches, the Diesel engine is attached to a transmission housing containing a hydraulic torque amplifier, a set of reversible reduction gears, and a hydraulic retarder. This combination drives the wheels through axle mounted final reduction gears.

Both of these engines and their drive systems are heavy, costly, and require frequent and expensive maintenance procedures. Their exhaust gases also contribute to atmospheric contamination.

Thus there is a need for a multiple cylinder reciprocating vapor expansion engine that can develop its maximum torque at rotational start up and whose work power output per pound of weight is greater, by using an external-combustion source of high pressure vapor energy.

Further, there is a need for an engine that has no internal fluid heat rejecting function, no external mechanical valve operating apparatus, and needs no valve tappet adjustments.

Also, there is a need for an engine that has a computer system that integrates all variable operating conditions to digitally directly actuate the intake valve and exhaust valve for the most efficient energy consumption and maximum power output.

Lastly, there is a need for an engine that is reversible and performs equally well in either clockwise or counter-clockwise rotation, and that can direct-drive the traction wheels.

None of the known prior art disclose such an engine and computer combination as set forth herein.

The present invention as delineated meets these needs.

OBJECT OF THE INVENTION

This invention provides in general, a major design modification, to a conventional cylinder head structure of a typical four stroke, air compression, internal combustion engine, to adapt it for external combustion operation.

It is an object of this invention to form a simple engine design having cylinder head valves that are self-closing and self-adjusting. Only light springs are needed to bias the valves to their normal position.

It is a further object of this invention to form a simple engine design having computer controlled cylinder-head valves that are directly actuated without external assistance, by solenoid devices electrically responding to a digitally integrated program.

It is also a further object of this invention to provide an engine that is quiet, has a smooth torque flow and is reversible, needs less maintenance and requires a reduced total investment.

SUMMARY OF THE INVENTION

The present invention comprises a device having five basic elements which, in combination, provide a simple engine structure that efficiently converts a supply of high pressure, high temperature, combustion gas/vapor from an external source into rotational shaft work. The basic elements are; first, a conventional reciprocating engine base housing or crankcase having a crankshaft, a connecting rod, and a piston operating in a tubular cylinder. Second, the cylinder wall is perforated with openings at the low end of the piston travel that release the expanded vapor into an attached surrounding chamber for exhaust to the atmosphere. Third, a cylinderhead structure, that clamps the tubular cylinder to the crankcase, and contains the intake valve, its actuating mechanism, and the compression release-exhaust valve. Fourth, heat isolated electrical solenoids that directly depress the valve stems to actuate the valves. Fifth, a mass of molded plastic magnesia/glass fiber insulation surrounding the cylinderhead to enhance engine thermal efficiency and insulate the solenoids from radiated heat.

The five above delineated elements combined in a five or more cylinder, external combustion engine assembly, provides the optimum smooth flow of torque in forward or reverse rotation.

BRIEF DESCRIPTION OF THE DRAWINGS

The present invention may be more readily described by reference to the accompanying drawing in which.

DESCRIPTION OF THE PREFERRED EMBODIMENT

Figure 1:
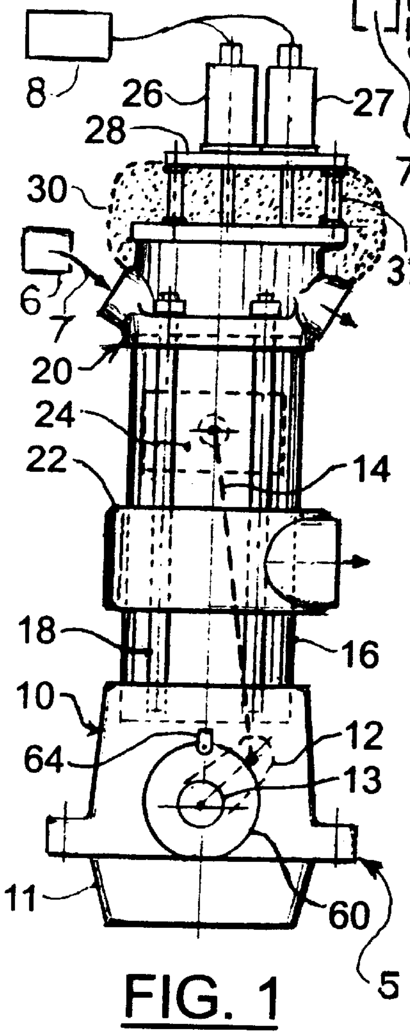
FIG. 1 is an elevation view of the shaft end of an assembled reciprocating engine as modified herein.

Referring now to the drawing, FIG. 1 illustrates an end view of a fully assembled reciprocating engine 5, a conventional base housing 10 an oil pan 11, a crankshaft 12, bearings 13, and a connecting rod 14 which comprises the lower structure of a typical rotational power producing engine. An individual tubular cylinder 16 is secured to base housing 10, by tie rods 18, and extends from a cylinderhead 20, through exhaust chamber 22,and anchors in base housing 10. Connecting rod 14 moves downwardly by piston 24 within cylinder 16 thereby inducing rotation of crankshaft 12.

Two valve actuating solenoids 26, 27 are secured on a mounting plate 28 which separate from cylinderhead 20 by spacer studs 32 and insulation30. Insulation 30 surrounds cylinderhead 20 retaining its heat.

Figure 2:
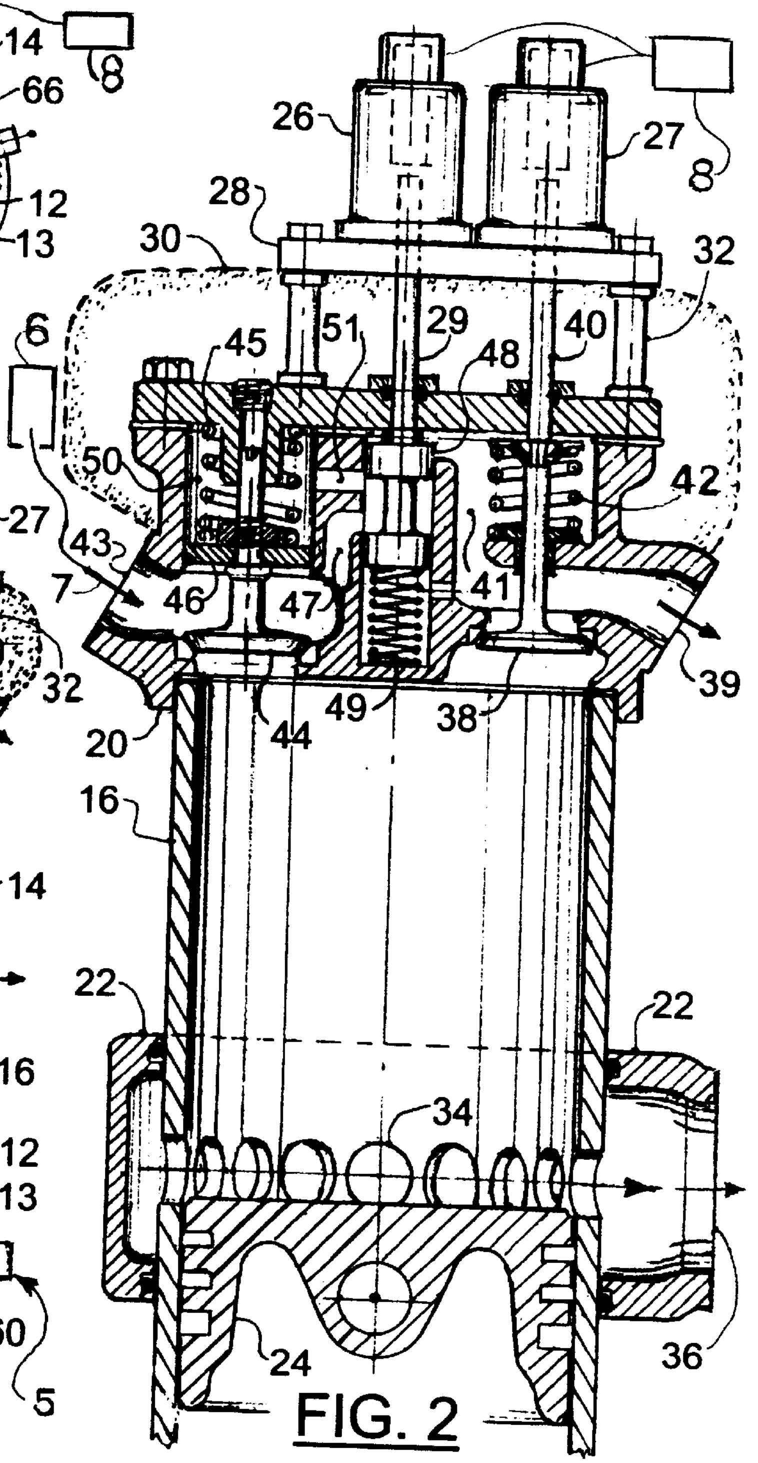
FIG. 2 shows a partial sectional view of the intake valve, dump valve, compression release-exhaust valve, piston, cylinder, exhaust ports, and the electric solenoid operating mechanism.

The working mechanical elements involved in the high pressure vapor expansion cycle of piston actuation are best seen in FIG. 2. Piston 24 is shown at the low end of its vertical travel within cylinderl6 which exposes a ring of exhaust holes 34 formed at that low point in the circumference of the wall of cylinderl6. Expanded vapor, after doing work on the downward stroke of piston 24 releases through exhaust holes 34 into a surrounding attached exhaust chamber 22 and is subsequently vented through an exhaust port 36 to an exhaust manifold (not shown).

Piston 24 on its upward stroke pushes the residual expanded vapor out through a flat-disc type exhaust-compression release valve 38 and port 39 to another exhaust manifold (not shown).

A compression release valve stem 40 extends up through a cavity 41 in cylinderhead 20 which contains a compression release valve bias spring 42 and extends through mounting plate 28 that secures the solenoid 27. A computer 8 digitally actuates solenoid 27 which depresses valve stem 40 to open exhaust valve 38 preventing the re-compression of the residual expanded vapor, by releasing it to the exhaust manifold. Computer 8 varies the release time of solenoid 27 which allows bias spring 42 to close exhaust valve 38 and cause some re-compression that assists the opening of the intake valve 44.

A high pressure vapor 7 from an external source 6 enters intake port 43 and presses downwardly on stainless steel plug-disc type intake valve 4 making it self-closing, and presses upwardly against interconnected bias disc 46 and an intake valve bias spring 45. Intake vapor 7 also flows through a bias duct 47 to the center of a piston type dump valve 48 which is held in the up position by a bias spring 49. Intake vapor 7 then enters an intake bias spring chamber 50 through a dump duct 51, and presses down against bias disc 46. Bias disc 46 has a diameter slightly larger than interconnected intake valve 44 and thereby holds the intake valve 44 closed.

When computer 8 integrates all the load parameters of economical operation, it then commands solenoid 26 to depress stem 29 of dump valve 48 downwardly. This movement blocks the vapor flow in bias duct 47, which now allows intake bias chamber 50 vapor pressure to unload from bias disc 46 and vent through dump duct 51 through cavity 41 to compression release port 39 and out to an exhaust. manifold (not shown). This loss of opposing vapor pressure in bias chamber 50 allows intake vapor 7 to press bias disc 46 up to open interconnected intake valve 44. Intake vapor 7 now flows into cylinder 16 and forces piston 24 down.

Computer 8 controls the duration of high pressure intake vapor 7 flow to match the engines varying power requirement It determines the total time of open flow through intake valve 44 as a percentage of piston travel, (often called "%cut-off," in the trade) by releasing solenoid 26 letting bias spring 49 reset dump valve 48. Thus it allows the instantaneous flow of intake vapor 7 through duct 47 to the top side of bias disc 46 which forces the closing of intake valve 44 and thereby cuts off the vapor 7 into the cylinder. The vapor in cylinder 16 now expands and continues the power stroke until exhaust holes 34 are exposed.

Long intake valve 44 open time produces high torque values, while a short open time is desirable for maintaining high speeds on a limited vapor supply. Thus, the invention does not need a throttle valve with it's power wasting pressure-reducing effect to be installed, and no external fluid heat rejection means with its large energy loss is required.

The engine 5 functions as a power producer by the economical consumption of vapor pressure and heat. Since a molded fiber matrix jacket of insulation 30 surrounds a cylinderhead 20 to conserve heat, no cylinderhead cooling system is needed.

Figure 3:
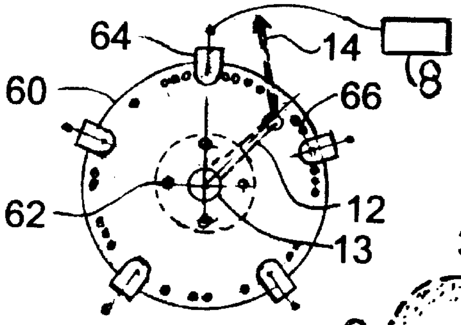
FIG. 3 shows the integrating shaft-mounted perforated disc, and the individual transponders that indicate their crank position to the computer.

As best seen in FIG. 3, individual engine computer 8 receives commands from a master train controller, a power economiser programmer, and the piston position that is determined by an angular indicating disc 60 having light transmitting equally spaced holes 66, mounted on a crankshaft extension 62. A light transmitting transponder 64 reads the crankshaft angular position by means of 179 equally spaced holes ( 180th hole blank, in alignment with crank arm 12 of first piston connecting rod 14), transponder 64 sends signals to the computer 8 to integrate the opening and closing timing of the cylinder head valves38 and 48 and determine the exact power requirement for optimum use.

FIG. 3 also shows five light emitting electronic transponders 64 spaced equally on the perimeter of the disc, one for each cylinder 16 of a preferred five piston engine 5. An identical computer 8 program for each cylinderhead assembly, when integrated, gives a combined smooth positive flow of torque output to accelerate a vehicle in a forward or reverse direction.

Although but one embodiment of the invention has been shown and described, it will be obvious to those skilled in the art, that various changes and modifications may be made therein without departing from the spirit of the invention and the scope of the appended claims.

What is claimed is:

1. A reciprocating vapor expansion power generating device comprising:

a base housing having a crankshaft mounted therein by bearings, a piston attached to a crankshaft by a connecting rod, the piston sliding within a tubular cylinder secured to the base housing by tie rods passing through an exhaust chamber to clamp a cylinderhead assembly to the base housing, the cylinderhead assembly containing a plug-disc type intake valve attached to a bias disc, a piston type dump valve for controlling the opening and closing of said intake valve, a flat-disc type exhaust valve with a bias spring holding said exhaust valve normally closed, an external source of high pressure vapor continuously supplied to the intake valve port, external actuating means mounted above said cylinderhead assembly to control both said dump valve and said exhaust valve when responding to computer commands, the external actuating means, opens the intake valve for said vapor to press against the piston inducing shaft rotation, close the intake valve, the vapor expanding against the piston until being released through said exhaust valve to the atmosphere.

2. The device set forth in claim 1, wherein the tubular cylinder has a circumferential set of holes at the bottom end of the piston travel which releases the expanded vapor into a separate surrounding exhaust chamber and thereby vents out to atmosphere.

3. The device set forth in claim 1 wherein the external actuating means comprises two electrical solenoids, insulatedly and commonly and spacedly secured above the cylinderhead assembly that directly depress the dump valve stem and exhaust valve stem when commanded by a separate integrating computer, said computer responding to a train controller determines a choice of clockwise and counter-clockwise engine rotation.

4. The device set forth in claim 1 wherein the plug type intake valve disc on a common shaft with a slightly larger opposing bias disc, the intake port vapor pressing against both discs and a bias spring holding said intake valve closed, intake port vapor being ducted through the piston type dump valve to the top side of the bias disc, thereby maintaining equilibrium until a dump valve stem when externally depressed, closes the intake duct and releases the opposing vapor pressing on the bias disc to exhaust, thereby allowing the intake port vapor to raise the bias disc, open the intake valve disc and flow into the cylinder.

5. The device set forth in claim 1 wherein a piston position indicating means deriving from electronic pulsations created by a light emitting transponder reads the apertures of a disc mounted on a crankshaft extension; a specific blank disc aperture in alignment with the centerline of the crank arm, gives a signal that is transmitted as a crank position reference to the computer program for rotation forward and reverse.

6. The device set forth in claim 1 wherein a molded insulation jacket, interposed beneath the solenoid common base plate totally surrounds the cylinderhead assembly, retains heat energy, improves engine thermal efficiency, and protects the solenoids from radiated heat.

7. The device set forth in claim 1 having a simple exclusionary means of retaining and using the maximum of the supplied heat energy for the production of shaft work.

* * * * *